US011761780B1

(12) United States Patent
Duenas Arana et al.

(10) Patent No.: US 11,761,780 B1
(45) Date of Patent: Sep. 19, 2023

(54) DETERMINING DATA FOR SEMANTIC LOCALIZATION

(71) Applicant: Zoox, Inc., Foster City, CA (US)

(72) Inventors: Guillermo Duenas Arana, Chicago, IL (US); Soroush Dean Khadem, Boulder, CO (US); Till Kroeger, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 155 days.

(21) Appl. No.: 17/334,190

(22) Filed: May 28, 2021

(51) Int. Cl.
| | |
|---|---|
| *G01C 21/36* | (2006.01) |
| *G01C 21/00* | (2006.01) |
| *G06K 9/00* | (2022.01) |
| *B60W 60/00* | (2020.01) |
| *G06V 20/58* | (2022.01) |

(52) U.S. Cl.
CPC ....... *G01C 21/3644* (2013.01); *B60W 60/001* (2020.02); *G01C 21/387* (2020.08); *G01C 21/3811* (2020.08); *G06V 20/58* (2022.01); *G06V 20/584* (2022.01)

(58) Field of Classification Search
CPC ............ B60W 60/001; G01C 21/3811; G01C 21/387; G01C 21/3644; G06V 20/58; G06V 20/584
See application file for complete search history.

(56) References Cited

U.S. PATENT DOCUMENTS

| | | | | |
|---|---|---|---|---|
| 2014/0072173 | A1* | 3/2014 | Haas | G06T 7/74 382/103 |
| 2019/0271550 | A1* | 9/2019 | Breed | G08G 1/205 |
| 2022/0187095 | A1* | 6/2022 | Lee | B60W 40/105 |

* cited by examiner

*Primary Examiner* — Rachid Bendidi
*Assistant Examiner* — Sahar Motazedi
(74) *Attorney, Agent, or Firm* — Lee & Hayes, P.C.

(57) ABSTRACT

Techniques for determining map data for localizing a vehicle in an environment are discussed herein. A vehicle can capture sensor data such as image data and can detect objects in the sensor data. Detected objects can include semantic object such as traffic lights, lane lines, street signs, poles, and the like. Rays based on a pose of the sensor and the detected objects can be determined. Intersections between the rays can be determined. The intersections can be utilized to determine candidate landmarks in the environment. The candidate landmarks can be utilized to determine landmarks and to eliminate other candidate landmarks. The map data can be determined based on the three-dimensional locations and utilized to localize vehicles.

20 Claims, 7 Drawing Sheets

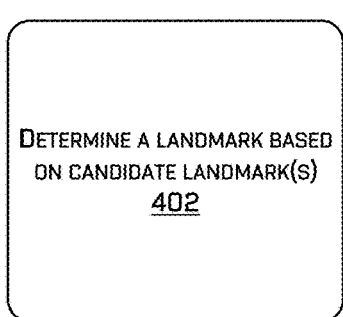
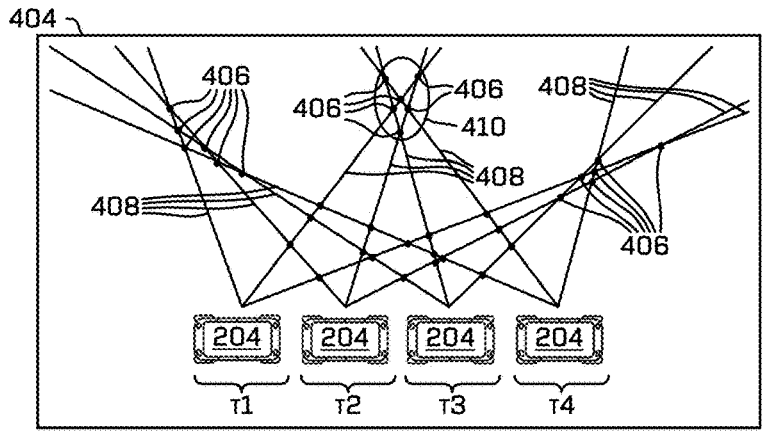
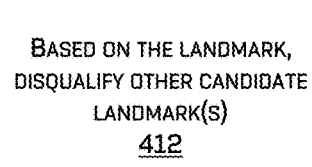
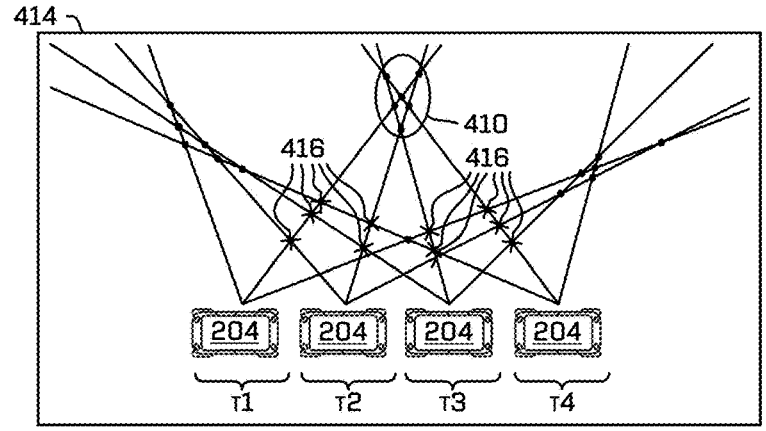
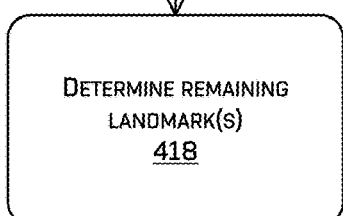
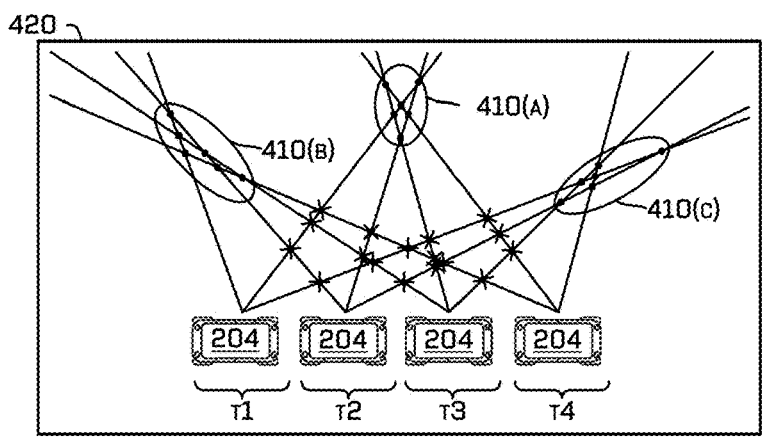
FIG. 4

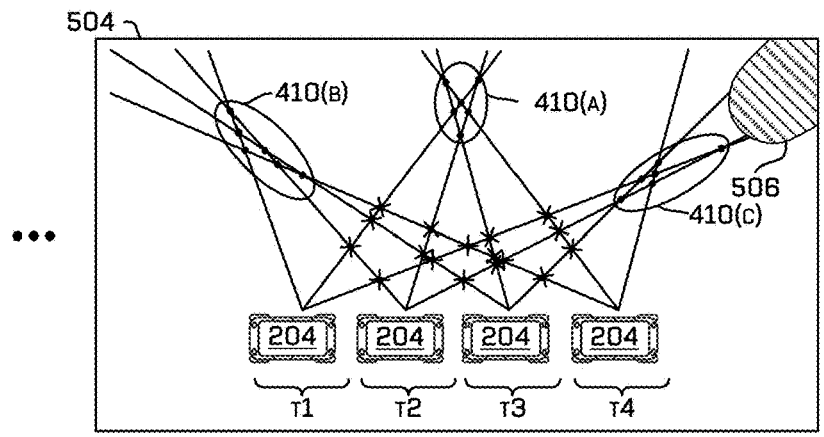
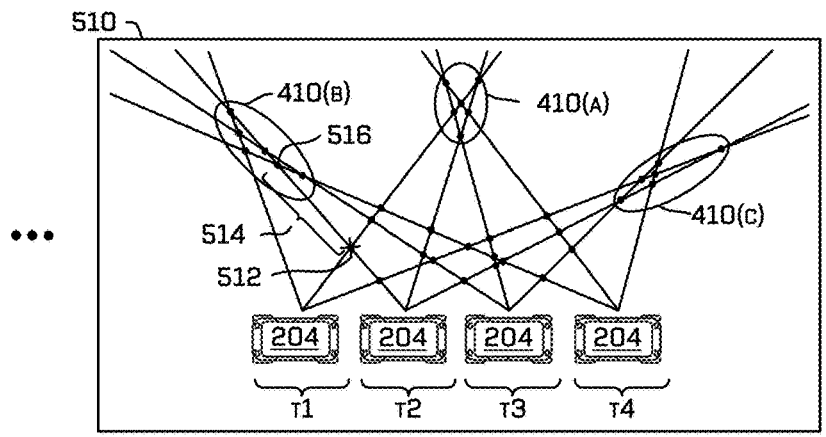
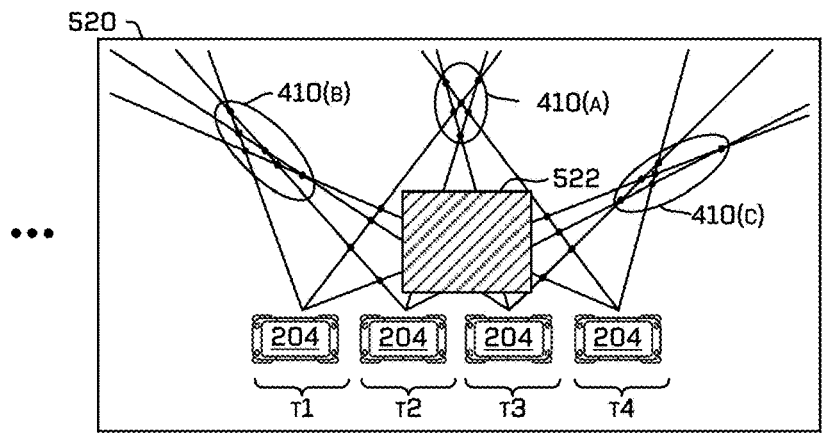
FIG. 5

US 11,761,780 B1

DETERMINING DATA FOR SEMANTIC LOCALIZATION

BACKGROUND

Data can be captured in an environment and represented as a map of the environment. Often, such maps can be used by vehicles navigating within the environment, although the maps can be used for a variety of purposes. Vehicles can capture sensor data and can determine a location of the vehicle relative to the map. As such, it is important for the data to be up to date in order to provide accurate input to vehicle computing systems.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 4 is a pictorial flow diagram of an example process of determining landmarks.

FIG. 5 depicts example techniques for eliminating candidate landmarks.

DETAILED DESCRIPTION

Figure 1:
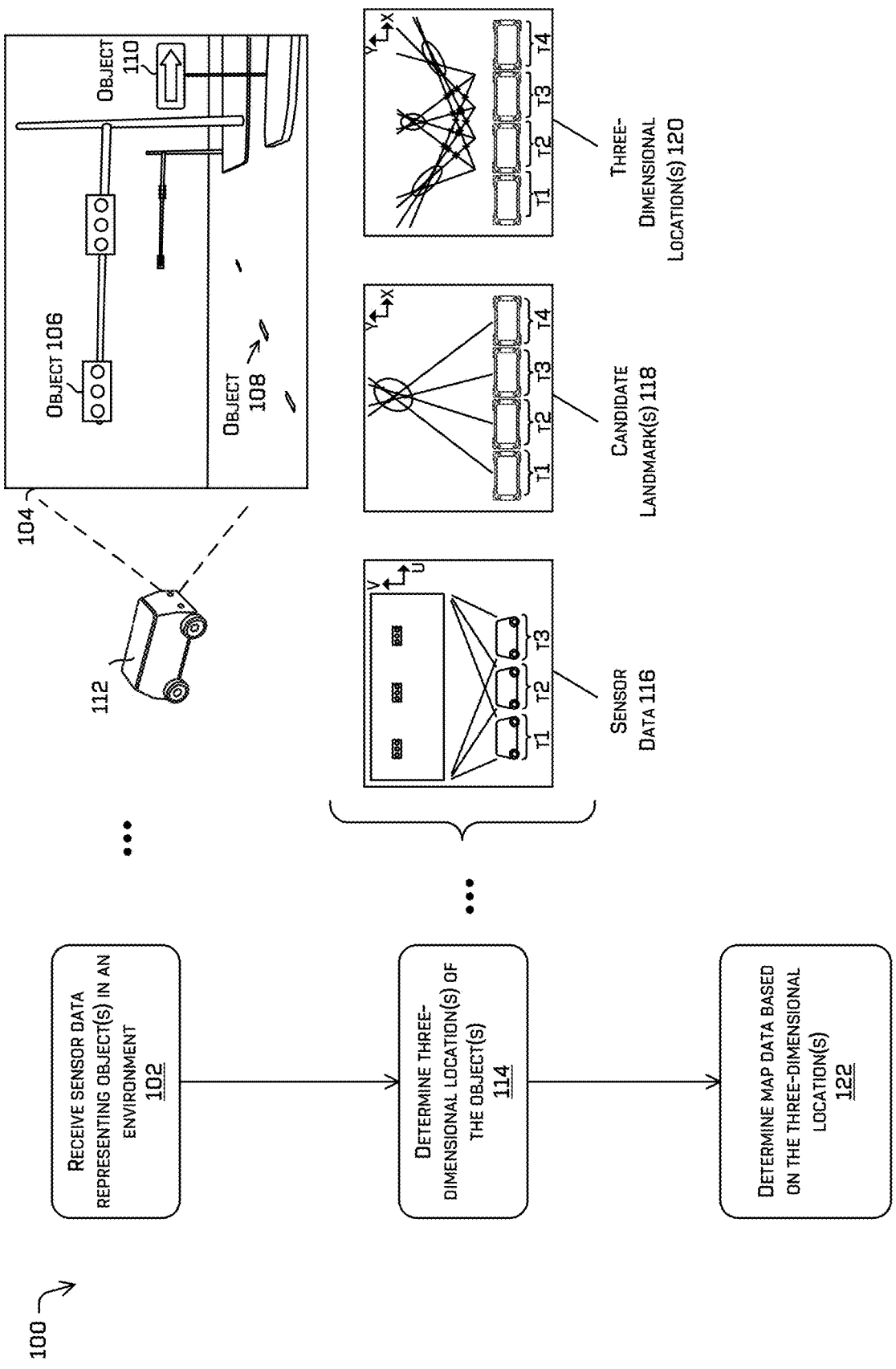
FIG. 1 is a pictorial flow diagram of an example process of capturing sensor data, projecting map data into the sensor data, determining three-dimensional location(s) based on the sensor data and map data, and performing an action based on the three-dimensional location(s).

Techniques for determining map data for localizing a vehicle in an environment are discussed herein. In some examples, the map data can include data about semantic objects (also referred to herein as "objects") in an environment. Such objects can include "generic" features such as traffic lights, lane markings, and the like. The vehicle can use a sensor, such as an image sensor, to capture sensor data representing an environment. The objects can be detected in the sensor data. Rays can be determined in a three-dimensional environment based on the detected object and a pose of a vehicle and/or a pose of a sensor of the vehicle, the plurality of rays being cast into the three-dimensional environment. Intersections between the rays can be determined. The intersections can be utilized to determine candidate landmarks in the environment. However, not all candidates may represent actual landmarks in the environment. As such, the candidate landmarks can be utilized to determine landmarks and to eliminate other candidate landmarks. The landmarks can be utilized to determine three-dimensional locations of objections associated with the candidate landmarks. Such refined landmarks can be used in various applications, such as mapping, localization, odometry, and the like. The map data can be determined based on the three-dimensional locations and transmitted to vehicles in the environment. The map data can be utilized to localize the vehicles.

Characteristics and/or aspects (e.g., objects) associated with the environment can be detected in the sensor data. The sensor data can be utilized to determine a two-dimensional location of each of the object(s) in the image. The sensor data can be associated with a location and/or orientation of the sensor and/or the vehicle at the time of capturing the sensor data. The vehicle can be associated with a different time at each of the location(s). Portions (e.g., partial portions or complete portions) of sensor data utilized to determine the two-dimensional location for each of the object(s) can be the same for the vehicle at each of the time(s). A pose of the vehicle and/or a pose of one or more sensors of the vehicle can be determined. Alternatively or additionally, the pose of the vehicle and/or the pose of the sensor(s) can be received from any system (e.g., the same system or a different system), including a remote system or a system of the vehicle. Optimization between the determined pose(s) (e.g., the determined pose of the vehicle and/or the determined pose of the sensor(s)) and the received pose(s) (e.g., the received pose of the vehicle and/or the received pose of the sensor(s)) can be performed and used as an additional signal for localization of the each of the object(s).

In some examples, techniques can include determining rays associated with detected objects. For example, a ray can be determined based on the detected object (e.g., (u,v) image coordinates), a pose of the vehicle capturing the data, and/or a pose of the sensor capturing the data. The ray is then defined in the environment as a vector originating at the sensor origin and passing through the particular <u, v> pixel coordinate, defining the 3D ray. In some examples, the pose of the vehicle can include both the vehicle pose and the sensor pose. The sensor data associated with objects can be utilized to determine candidate landmarks. The sensor data can be utilized to determine rays extending from the vehicle and through the each of the object(s). Each of the rays can extend from the vehicle and through one of the object(s). Rays can be determined in a three-dimensional space as a vehicle traverses an environment, the plurality of rays cast into the three-dimensional space. Intersections associated with the rays can be determined. In some examples, object tracking data and/or image embedding data (e.g., instance segmentation information) can be used to determine which rays correspond to which objects (or that multiple rays over time correspond to a same object). Groups of intersections can be determined based on the intersections. One or more of the intersections can be included in each of the groups of intersections. The groups of intersection can be utilized to determine whether one or more intersections of any of the groups are associated with a same object in the environment.

In some examples, intersections can be eliminated from being included in the groups based on covariance data, map data, and/or distances between intersections or groups of intersections representing the intersections. As a non-limiting example, if multiple intersections are determined along a ray, the techniques described herein may infer that such an intermediate intersection is not associated with a true object in the environment. In some examples, intersections can be determined to be included in the groups based on covariance data, map data, and/or distances between intersections or groups of intersections representing the intersections. Each of the groups of intersections can include the candidate element(s) associated with each intersection in the group.

An intersection density associated with each of the groups of intersections can be determined. A candidate landmark can be determined based on the candidate landmark being associated with the highest number of intersections, a highest density of landmarks, a density of the intersections above a threshold, and the like. Candidate landmarks can be disqualified based on covariance data, map data, and/or distances between intersections or groups of intersections representing the candidate landmark. As candidate landmarks are determined to be landmarks, other intersections or candidate landmarks can be disqualified or removed from being considered as candidate landmarks and/or landmarks. Landmarks can be determined and candidate landmarks can be disqualified to determine three-dimensional locations of each landmark in an environment. The map data can be utilized to localize the vehicle(s), based on the three-dimensional location(s).

The map generation techniques described herein can improve a functioning of a computing device by providing a robust method of determining a position of a landmark in an environment. Three-dimensional locations of landmarks can be determined based on sensor data associated with an environment. The techniques of determining candidate landmarks can robustly identify landmarks and reject candidate landmarks, which can lead to accurate map data. The techniques can be automated to rapidly generate map data as an environment changes. In the context of localization, the techniques discussed herein can provide an orthogonal localization system that can be used separately from or in combination with another localization system. In some cases, the use of semantic map features can provide for smaller data sizes of maps relative to mesh-based maps, which can allow memory or processing power to be used for other operations. Further, safe trajectories can be planned by knowing a position of a vehicle in an environment.

The techniques described herein can be implemented in a number of ways. Example implementations are provided below with reference to the following figures. Although applicable to vehicles, such as autonomous vehicles, the methods, apparatuses, and systems described herein can be applied to a variety of systems and are not limited to autonomous vehicles. In another example, the techniques can be utilized in an aviation or nautical context, or in any system configure to input data to determine three-dimensional locations associated with objects in an environment. Additionally, the techniques described herein can be used with real data (e.g., captured using sensor(s)), simulated data (e.g., generated by a simulator), or any third of the two.

FIG. 1 is a pictorial flow diagram of an example process 100 of capturing sensor data, projecting map data into the sensor data, determining three-dimensional location(s) based on the sensor data and map data, and performing an action based on the three-dimensional location(s).

An operation 102 can include receiving sensor data representing one or more objects in an environment. The sensor data can include image data representing the object(s). Additionally or alternatively, the operation 102 can include receiving lidar data, radar data, audio data, time of flight data, and the like. Although the image data is utilized to determine the three-dimensional location(s) as discussed in this disclosure, it is not limited as such. Any type of data (e.g., lidar data, radar data, audio data, time of flight data, etc.) can be used in a similar way as for the image data as discussed through the disclosure. The sensor data can include any number and type of objects. Further, the operation 102 can include receiving sensor data from a single sensor or multiple sensors. In some examples, the operation 102 can include receiving the sensor data from a vehicle and/or other vehicles. Each of the vehicle and/or the other vehicles can include the single sensor or the multiple sensors. In some examples, the operation 102 can be performed by each of the vehicle and/or the other vehicles as it traverses the environment.

An example 104 illustrates an environment including sensor data, illustrated as image data. The sensor data includes an object 106 (e.g., a traffic light), an object 108 (e.g., a lane marking), and an object 110 (e.g., a sign).

In some instances, the example 104 can include a vehicle 112. In some instances, the vehicle 112 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 112 can be a fully or partially autonomous vehicle having any other level or classification. Moreover, in some instances, the techniques described herein can be usable by non-autonomous vehicles as well.

The sensor data can include image data received from the vehicle 112. The image data can be received from a single sensor or multiple sensors of the vehicle 112. The image data can be associated with a single time (or sensor data associated with substantially the same time, based on technical tolerances) or image data captured over a period of time. The sensor data can be associated with a pose of the vehicle (x, y, z, yaw, pitch, roll) and/or a pose of the sensor (x, y, z, yaw, pitch, roll, orientation, field of view, etc.). In some examples, the pose of the sensor can include a pose of the sensor associated with the world. The pose of the sensor associated with the world can include a pose (e.g., also referred to as "pose of the sensor") that is a combination of a vehicle pose associated with the world and a sensor pose associated with the vehicle.

An operation 114 can include determining one or more three-dimensional locations of object(s). The three-dimensional locations be determined based on sensor data 116. The sensor data 116 can correspond to sensor data 206, discussed below in FIG. 2. The sensor data 116 can include the image data, and any of the object(s) in the image data. For example, the sensor data 116 can include three objects (e.g., objects 106). Each of the three objects can be of the same type or a different type as the object 106. The sensor data 116 can be captured by a vehicle (e.g., the vehicle 112) at different times (e.g., a time t1, a time t2, a time t3, a time t4 (not shown), etc.).

The sensor data 116 can be utilized to determine one or more candidate landmarks 118. The candidate landmark(s) 118 can be determined based on rays associated with the sensor data 116. The rays can be extended from the vehicle 112 at different times (e.g., the time t1, the time t2, the time t3, the time t4, etc.). For example, each of the rays can extend from the vehicle 112 at one of the times. The rays can extend in directions associated with bounding boxes associated with each object, covariance data associated with each object, etc. Additional information can be determined and/or received about each object, such as semantic classification, embedding information, tracking information, and the like. Examples of using embeddings to determine that an object is the same in different frames are discussed in, for example, U.S. patent application Ser. No. 16/147,328 titled "Image Embedding for Object Matching;" and filed Sep. 28, 2018; and U.S. patent application Ser. No. 16/215,554 titled "Bounding Box Embedding for Object Identifying" and filed Dec. 10, 2018, which are incorporated by reference herein in its entirety for all purposes Each of the rays can extend from the vehicle 112 in a direction based on a bounding box, covariance data, etc. associated with one of the objects 106. Each of the candidate landmark(s) 118 can be associated with an intersection of more than one of the rays. Additional details of determining candidate landmark(s) 118 are discussed below in connection with FIG. 3, as well as throughout the disclosure.

The candidate landmark(s) 118 can be utilized to determine one or more three-dimensional locations 120. Each of the three-dimensional location(s) 120 can be associated with a landmark. The landmark can be associated with at least one of the candidate landmark(s) 118. Each of the landmarks can be determined based on an intersection density associated with one or more of the candidate landmark(s) 118. As candidate landmarks are determined to be landmarks (and associated three-dimensional locations are determined), such landmarks can be used to disqualify other candidate landmarks, which simplifies a search space for identifying other landmarks. Additional details of determining three-dimensional location(s) are discussed below in connection with FIG. 4 as well as throughout the disclosure.

An operation 122 can include determining map data based on the three-dimensional location. The map data can be utilized to control one or more vehicles (e.g., the vehicle 112 or other vehicles) to navigate through the environment. The map data can be used for semantic localization of the vehicle 112. Examples of semantic localization are discussed in, for example, U.S. patent application Ser. No. 17/119,518 titled "Localization Based on Semantic Objects" and filed Dec. 11, 2020, and Ser. No. 17/119,562 titled "Calibration Based on Semantic Objects" and filed Dec. 11, 2020, each of which is incorporated by reference herein in its entirety for all purposes.

Figure 2:
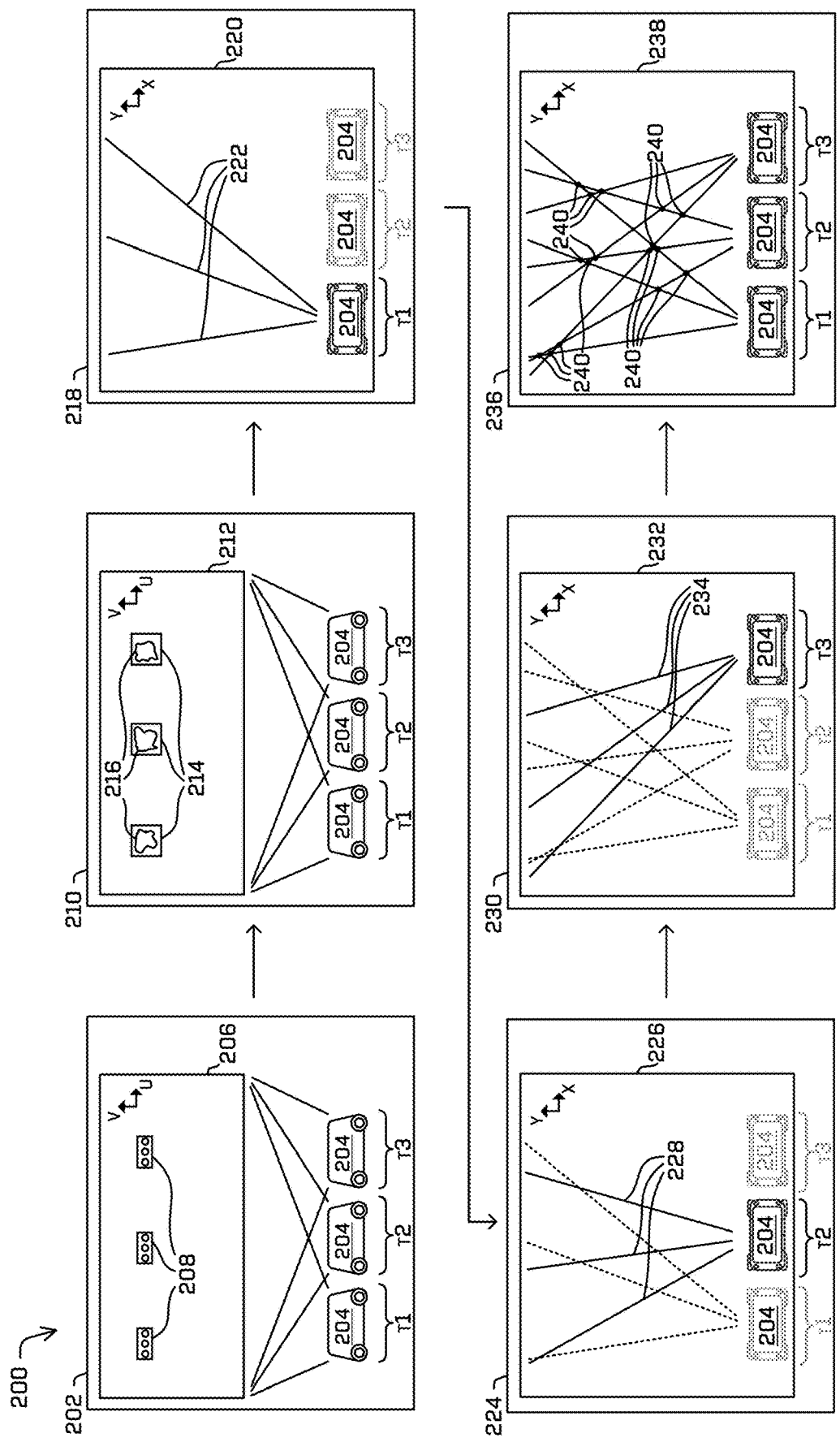
FIG. 2 depicts an example process for determining rays and intersections associated with the rays, in accordance with examples of the disclosure.

FIG. 2 depicts an example process 200 for determining rays and intersections associated with the rays, in accordance with examples of the disclosure.

An example 202 illustrates an environment including a vehicle 204 at different times (e.g., a time t1, a time t2, and a time t3). The vehicle can include one or more sensors utilized to capture sensor data (e.g., image data) 206. The sensor data 206 can include objects 208. For example, each of the objects 208 can be a traffic light. Although the objects 208 being the same type of objects are discussed in this disclosure, it is not limited as such. The objects 208 can include any number of objects. Any of the objects 208 can be of any object type (e.g., any type of semantic object, including but not limited to traffic lights, lane lines, street signs, poles, mailboxes, fire hydrants, and the like). Any of the objects 208 can be at any location in the environment.

Image coordinates associated with the objects 208 and the associated camera pose in the environment can be determined and utilized to determine the rays 222. The coordinates associated with each of the objects 208 (in the image space) can include a u-coordinate and a v-coordinate in the sensor data 206.

An example 210 illustrates sensor data 212. The sensor data 212 can include the sensor data 206, which can be utilized to determine bounding boxes 214 associated with objects 208, and the like. Each of the bounding box 214 can be associated with one of the objects 208. The sensor data 212 can be utilized to determine a center point (not shown) of each of the objects 208, as well as covariance data 216 associated with each of the objects 208. In some examples, the covariance data 216 can be based on or can be associated with extents (e.g., length, width, height) of each of the objects 208 as represented by a bounding box. The bounding boxes 214 can include two-dimensional bounding boxes, each of which being associated with one of the objects 208 represented in the sensor data 206. The sensor data 212 can include the bounding boxes 214, the center points, and the covariance data 216.

An example 218 illustrates a top-down view 220 based on the sensor data 212. The top-down view 220 can include the vehicle 204 at different times (e.g., the time t1, the time t2, and the time t3). Rays 222 can be determined based on the bounding boxes 214 and/or the covariance data 216. The rays 222 can be associated with the objects 208. Each of the rays 222 can be determined based on one of the bounding boxes 214 and/or one of the covariance data 216. The rays 222 can be determined based on the pose of the vehicle 204 at the time t1, and/or a pose of the sensor capturing the sensor data 212. In some examples, the pose of the vehicle 204 can include both the vehicle pose and the sensor pose. Each of the rays 222 can extend from the vehicle 204 at the time t1. Although the rays 222 determined based on the bounding boxes and/or the covariance data 216 are discussed in this disclosure, it is not limited as such. Rays can be determined based on any information (e.g., information in the sensor data (e.g., the sensor data 206)) associated with objects (e.g. the objects 208).

Each of the rays 222 (e.g., a ray 222) can be associated with one of the objects 208 (e.g., an object 108) of an unknown size and at an unknown distance. In some examples, the ray 222 can be associated with the object 108 of a first size and at a first distance. In other examples, the ray 222 can be associated with the object 108 of a second size and at a second distance. A distance associated with the ray 222, between the vehicle 204 and the object 108 of the first size or the object 108 of the second size, can be initially unknown, based on the u-coordinate and the v-coordinate (and the pose of the vehicle/sensor at the time of capturing image data) being utilized to determine the ray 222. The location of the object along the ray may initially be unknown (e.g., the object can be a big object far away or a small object nearby).

The coordinates of each of the objects 208 in the top-down view 220 can include an x-coordinate and a y-coordinate. The x-coordinate and the y-coordinate can be initially unknown, based on a distance between the vehicle 204 and any of the objects 208 being unknown.

An example 224 illustrates a top-down view 226 based on the sensor data 212. The top-down view 226 can include the rays 222 (shown as dotted lines, with reference numerals not shown, for clarity). The top-down view 226 can include the vehicle 204 at different times (e.g., the time t1, the time t2, and the time t3). Rays 228 can be determined in a similar way as for the rays 222, except utilizing the vehicle 204 at the time t2 instead of the time t1.

An example 230 illustrates a top-down view 232 based on the sensor data 212. The top-down view 232 can include the rays 222 and 228 (shown as dotted lines, with reference numerals not being shown, for clarity). The top-down view 232 can include the vehicle 204 at different times (e.g., the time t1, the time t2, and the time t3). Rays 234 can be determined in a similar way as for the rays 222 and 228, except utilizing the vehicle 204 at the time t3.

An example 236 illustrates a top-down view 238 based on the sensor data 212. The top-down view 238 can include the rays 222, 228, and 234 (with reference numerals not shown, for clarity). One or more intersections 240 can be determined based on the rays 222, 228, and 234. Any of the intersection(s) 240 can be determined as an intersection between any one of the rays 222, 228, and 234 and one or more others of the rays 222, 228, and 234. Accordingly, because a group of intersections that includes at least one of the intersection(s) 240 can be determined to correspond to the same object, the intersection(s) 240 can be used in further operations, discussed below.

Although the examples 218, 224, 230, and 236 being determined in sequential order are discussed in this disclosure, it is not limited as such. Any of the examples 218, 224, 230, and 236 can occur in any order with respect to any other of the examples 218, 224, 230, and 236 and/or substantially simultaneously (e.g., within technical tolerances). Although the three different times at which the rays 222, 228, and 234 associated with the vehicle 204 extend are discussed in this disclosure, it is not limited as such. The number of the different times at which the rays extend from the vehicle 204 can be any number, with the number being greater than one. Although the vehicle 204 is discussed in this disclosure, it is not limited as such. Any number of vehicles at any positions can be utilized to determine locations points, and rays ending from the vehicles. In some examples, sensor data (e.g., any of the sensor data 206 and/or other sensor data) utilized to determine rays (e.g., any of the rays 222, 228, and 234, and/or any other rays) can be received from a same sensor of a same vehicle at different times, received from different sensors on a same vehicle (e.g., from one or more of the different sensors at the same time or different times), or received from one or more different vehicles (e.g., one or more sensors of any of the different vehicles).

Figure 3:
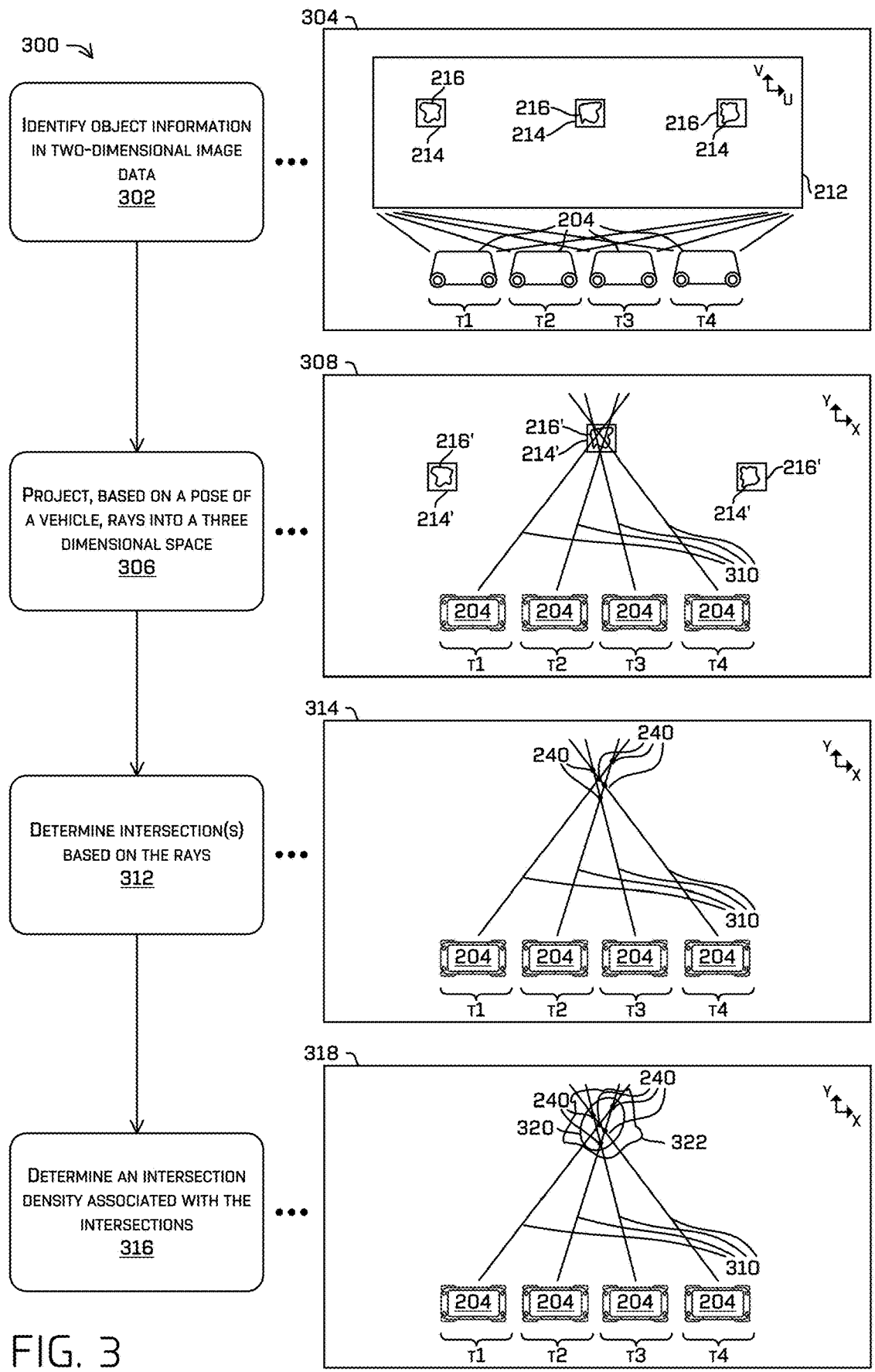
FIG. 3 is a pictorial flow diagram of an example process of determining one or more intersections, and an intersection density associated with the intersection(s).

FIG. 3 is a pictorial flow diagram of an example process 300 of determining one or more intersections, and an intersection density associated with the intersection(s).

An operation 302 can include identifying object information in two-dimensional image data. The object information can be determined based on sensor data captured from a vehicle at different times. The object information can include bounding boxes associated with objects, and the like. The bounding boxes can be associated with the objects. The sensor data can be utilized to determine center points of the objects, as well as covariance data associated with the objects. The bounding boxes can include two-dimensional bounding boxes associated with the objects represented in the sensor data.

An example 304 illustrates the sensor data 212 captured by a vehicle (e.g., the vehicle 204, illustrated in FIG. 2 and discussed above) at different times (e.g., the time t1, the time t2, the time t3, and a time t4). Although the vehicle 204 is illustrated at the times t1-t3 in FIG. 2, and at the times t1-t4 in FIG. 3, this is for convenience of explanation and is not limiting with respect to the disclosure herein. The processes illustrated in FIGS. 2 and 3 can be implemented for any number of vehicles at different positions and at different times. The sensor data 212 can include the bounding boxes 214 and the covariance data 216, illustrated in FIG. 2 and discussed above.

An operation 306 can include determining, based on a pose of a vehicle and a detection of an object in image data, rays into a three-dimensional space. In some examples, poses of one or more vehicles and/or one or more sensors can be utilized to determine rays cast into the three-dimensional space. Any of the rays determined based on the poses can be associated with an object. The sensor data can be utilized to determine the rays. The rays can be associated with the vehicle(s) at the different times. The rays can extend from the vehicle(s). The rays can be determined based on the bounding box and the covariance data associated with the object.

An example 308 illustrates rays 310 associated with an object (e.g., the object 208, illustrated in FIG. 2 and discussed above). The rays 310 can be determined based on the sensor data 212. Any of the rays 310 can be determined in a similar way as for any of the rays 222, 228, and 234, illustrated in FIG. 2 and discussed above. The rays 310 can extend from the vehicle. By way of example, one of the rays 310 (e.g., a ray 310) extending from the vehicle at the time t1 can be determined in a similar way as for one of the rays 222. Each of the bounding boxes 214 in the two-dimensional space discussed above in FIG. 2 may be determined as a bounding box 214' in the three-dimensional space. Each of the covariance data 216 in the two-dimensional space discussed above in FIG. 2 may be determined as covariance data 216' in the three-dimensional space.

An operation 312 can include determining one or more candidate intersections based on the rays. The intersection(s) can be determined based on any of the rays intersecting one or more other rays.

An example 314 illustrates intersections 240 determined based on the rays 310 cast from the vehicle 204 at different times. The rays 310 can intersect and form the intersections 240, illustrated in FIG. 2 and discussed above. Each of the intersections 240 can be determined based on any of the rays 310 intersecting one or more others of the rays 310.

Although the intersections are determined based on the rays 310 that intersect, as discussed in this disclosure, it is not limited as such. Any of the intersections can be determined based on determining two or more of the rays 310 most likely intersect (e.g., rays that appear to intersect, rays that are determined to nearly intersect, rays that have a high likelihood of intersecting, rays that approximately intersect, etc.). The rays 310 can be utilized to determine a "most likely intersection" associated with the rays 310 most likely intersecting. The "most likely intersection" can be determined, and interpreted as, an intersection 240. One or more "most likely intersections" can be determined. Each of the "most likely intersection(s)" can be determined as an intersection 240 based on two or more of the rays 310 that most likely intersect.

An operation 316 can include determining an intersection density associated with one or more intersections in a group of intersections. The intersection density can be associated with (e.g., proportional, and/or directly related, to) a number of intersections in the group of intersections. The group of intersections can be determined based on the intersection(s). A number of the intersection(s) in the group can be utilized to determine the intersection density. In some examples, intersections can be grouped based on being within a threshold distance of other intersections, covariance data (e.g., the covariance of the image and/or three dimensional coordinate), and the like. Additional covariance data including covariance data (e.g., any of the covariance data 216) associated with the two-dimensional image space and covariance data associated with the three-dimensional space can be determined. The additional covariance data can be a combination of the covariance data associated with the two-dimensional space and the covariance data associated with the three-dimensional space. The additional covariance data can be the covariance data associated with the two-dimensional space being transformed using a Kalman filter (e.g., an unscented Kalman filter (UKF)).

An example 318 illustrates a group of intersections 320 (also referred to herein as "group"). The group of intersections 320 can be determined based on one or more of the intersection(s) 240. The intersections 240 in the group 320 can be utilized to determine an intersection density. The intersection density can be associated with (e.g., proportional, and/or directly related, to) a number of intersections in the group 320. The intersection density can have a value associated with a value of the number of intersections in the group 320. In some examples, a number of intersections can be determined per group, in addition to or instead of an intersection density associated with a group. The group 320, and/or one or more of the intersections 240 associated with the group 320, can be determined as a candidate landmark. The candidate landmark can be determined based on the intersection density. The candidate landmark can be determined based on the intersection density meeting or exceeding a first threshold density (e.g., a threshold set as a predetermined threshold).

In some examples, covariance data 322 associated with the group 320 can be determined. The covariance data 322 can be similar to (e.g., partially similar or completely the same), or different from, the corresponding one of the covariance data 216 (e.g., one of the covariance data 216 associated with one of the objects determined in 318 to be the object with which the group 320 is associated).

In some examples, rays (also referred to herein as "data points") can be excluded based on exclusion criteria. Any intersection associated with any of one or more data points (e.g., any data point associated with, and/or captured by, the vehicle 204 or another vehicle in the environment) can be determined as not being an intersection 240 associated with the group 320 based on exclusion criteria. In some examples, the exclusion criteria can include an amount of time. The amount of time can be determined as a difference between an earliest time associated capturing a data point and a last time associated with capturing a data point. The data points can be excluded from elimination as data points that are associated with an intersection 240 in the group 320. The data points being excluded from elimination as being associated with an intersection 240 in the group 320 can be based on the difference of time being less than a threshold difference.

By excluding any of the data points from elimination, remaining data points can be eliminated as being associated with an intersection 240 in the group 320. By excluding data points from elimination, remaining data points can be eliminated based on the remaining data points being associated with objects (e.g., data points associated with objects that move) that are not semantic objects. The remaining data points can be eliminated based on the remaining data points not being associated with semantic objects (e.g., data points that are associated with shadows that move). Any intersections associated with the eliminated data points can be eliminated.

In some examples, a candidate landmark (e.g., a candidate landmark associated with a group of intersections associated with, and/or determined based on, data points) can be eliminated based on a semantic class of sensor data. In those examples, the candidate landmark can be eliminated based on the semantic class of sensor data associated with the candidate landmark (e.g., sensor data utilized to determine the candidate landmark).

In some examples, a candidate landmark can be eliminated based on a number of data points associated with a group (e.g., a group of intersections associated with the candidate landmark, the group being determined based on data points) being less than a threshold number of points. In some examples, a candidate landmark can be eliminated based on a difference between a first time associated with a first data point (e.g., a time at which the first data point is captured) of the group and a second time associated with a second data point (e.g., a time at which the second data point is captured) of the group meeting or exceeding a time threshold.

In some examples, the exclusion criteria can include a number of sensors associated with sensor data. More than ray utilized to determine one or more candidate landmark can be excluded from elimination based on a number of sensors associated with sensor data (e.g., the more than one ray) being less than a threshold number of sensors. In some examples, a candidate landmark can be eliminated based on the number of sensors associated with sensor data (e.g., sensor data utilized to determine the candidate landmark) being less than the threshold number of sensors.

In some examples, the exclusion criteria can include any intersection being excluded from elimination based on a distance associated with the intersection. Any intersection can be excluded from elimination based on the distance associated with the intersection being less than the threshold minimum distance (e.g., the distance to another intersection associated with a candidate landmark being less than the threshold minimum distance). Additionally or alternatively, any intersection can be eliminated based on a distance associated with the intersection (e.g., the distance meeting or exceeding the threshold minimum distance, as discussed below in FIG. 5). In some examples, a candidate landmark can be eliminated based on data between the candidate landmark and another candidate landmark (e.g., distances between intersections in the candidate landmark; and other distances between other intersections in another candidate landmark).

In some examples, the exclusion criteria can include any intersection being excluded from elimination based on the intersection not being associated with an elimination region. Additionally or alternatively, any intersection can be eliminated based on the intersection being associated with an elimination region (e.g., the elimination region 522 as discussed below in FIG. 5).

FIG. 4 is a pictorial flow diagram of an example process 400 of determining landmarks.

At operation 402, the process can include determining a landmark based on one or more candidate landmarks. Intersections can be determined based on rays extending from the vehicle at different times. Each of the intersections can be determined to be associated with a candidate landmark. A group of intersections can be determined as a candidate landmark. In some examples, techniques can include determining or selecting a candidate landmark with the highest number of intersections or the highest intersection density. In some examples, an intersection can be added to a group or rejected from being considered as a group based on determining covariance data of a hypothetical object before adding the intersection to the group and after adding the intersection to the group. For example, if an intersection added to a group increases a size of the covariance data, the intersection may be rejected from being considered as part of the group. In an intersection added to a group decreases the size of the covariance data, the intersection can be considered part of the group. Additional details are discussed in FIG. 5, as well as throughout this disclosure. Groups of intersections can be determined as candidate landmarks, based on the intersection densities or the number of intersection. The groups can be determined as candidate landmarks based on the intersection density of each of the groups. The candidate landmarks can be determined based on the intersection density of each of the groups meeting or exceeding a first threshold density (e.g., a threshold set as a predetermined threshold).

The landmarks can be determined based on the groups that have the intersection densities with the highest values. The candidate landmarks can be determined as landmarks based on the intersection density of each of the groups determined as the candidate landmarks. The landmarks can be determined based on the intersection density of each of the groups meeting or exceeding a second threshold density (e.g., a threshold set as a highest density among all of the intersection densities of any other groups determined based on the sensor data).

The landmarks can be determined based on a number of sensors utilized to capture the sensor data including the rays meeting or exceeding a threshold number of sensors. The sensors can include one or more sensors on a single vehicle or on each of more than one vehicle.

An example 404 illustrates intersections 406 determined based on rays 408 extending from the vehicle 204. Any of the intersections 406 can be determined in a similar way as any of the intersections 240, illustrated in FIG. 2 and discussed above. Any of the rays 408 can be determined in a similar way as any of the rays 310, illustrated in FIG. 3 and discussed above. Any of the intersections 406 can be associated with any of the rays 408 intersecting one or more others of the rays 408. Any of the intersections 406 in the group 410 can be determined to be associated with a candidate landmark. The group of intersections 410 can be determined as a candidate landmark. One or more of the candidate landmarks can be determined as a landmark, and/or utilized to determine another candidate landmark as a landmark. The landmark can be determined based on a group of intersections 410 (also referred to herein as "group"). The group of intersections 410 can be determined in a similar way as the group of intersections 240, illustrated in FIG. 2 and discussed above.

Intersection densities can be utilized to determine candidate landmarks and/or landmarks. An intersection density associated with the group 410 can be determined based on a number of intersections in the group 410. The group 410 can be determined as a candidate landmark, based on the intersection density of the group 410. Any of the candidate landmarks can be determined based on the intersection density of the group 410 meeting or exceeding a first threshold density (e.g., a threshold set as a predetermined threshold). The group 410 can be determined as the landmark based on the intersection density of the group 410 meeting or exceeding all of the intersection densities of the remaining groups. The remaining groups can be determined to include any other group associated with one or more of any of the other intersections. By way of example, the landmark can be determined based on the intersection density of the group 410 meeting or exceeding a second threshold density (e.g., a threshold set as a highest density among all of the intersection densities of any other groups determined based on the sensor data 212).

Any of the groups 410 can be determined as a landmark based on a number of sensors that capture the sensor data utilized to determine the intersections 406 in the group 410. The landmark can be determined based on the number of sensors meeting or exceeding a threshold number of sensors. The sensors can include one or more sensors on a single vehicle (e.g., the vehicle 204), or one or more sensors on each of more than one vehicle (e.g., the vehicle 204 and one or more other vehicles).

Any of the groups 410 can be determined as a landmark based on a time difference between any of the times associated with rays (e.g., the rays 408). By way of example, any of the groups 410 can be determined as a landmark based on a time difference between a first time (e.g., the time t1) and a second time (e.g., the time t2) at which the sensor data utilized to determine the intersections 406 in the group 410 is captured. The landmark can be determined based on the time difference meeting or exceeding a threshold time difference. By utilizing the time difference meeting or exceeding the threshold time difference, any intersections associated with objects that are different from the objects 208 can be eliminated as landmarks. The objects different from the objects 208 can include shadows, pedestrians, other vehicles, etc. The objects different from the objects 208 can be eliminated by utilizing the threshold time difference, based on any movement of the objects different from the objects 208.

At operation 412, the process can include, based on the landmark, disqualifying one or more other candidate landmarks. Any candidate landmark associated with one of the rays with which the landmark is associated can be disqualified. The candidate landmark(s) being disqualified can be utilized to determine any of the other candidate landmark(s) as a landmark.

An example 414 illustrates, based on the group 410 being determined as the landmark, disqualifying one or more other candidate landmarks. The candidate landmarks can be disqualified based on other intersections determined to be associated with the other candidate landmarks. The candidate landmarks (e.g., any intersection or group of intersections associated with the candidate landmark) can be disqualified based on the other candidate landmarks being associated with one of the rays 408 that extends through the landmark. Any of the other candidate landmark(s) (e.g., any intersection or group of intersections associated with the candidate landmark) that is disqualified can be determined as a disqualified candidate landmark 416.

In some examples, a threshold associated with a likelihood of any candidate landmark being a landmark can be determined. The likelihood can be determined based on a density of intersections of a group associated with the landmark. The likelihood can be determined further based on the exclusion criteria (e.g., whether the candidate landmark has been excluded from elimination). A first likelihood associated with a first candidate landmark being the landmark can be determined. A second likelihood associated with a second candidate landmark being the landmark can be determined. The first likelihood can be determined to meet or exceed the threshold. The second likelihood can be determined to not meet or exceed the threshold. The second candidate landmark can be disqualified as being the landmark based on the second likelihood being less than the threshold. The first candidate landmark can be determined as a candidate landmark associated with one of the groups 410. The second candidate landmark that is disqualified can be determined as a disqualified candidate landmark 416.

In some examples, a candidate landmark with a highest likelihood of being a landmark can be utilized to determine the candidate landmark as the landmark. A likelihood of the candidate landmark being the landmark can be determined as the highest likelihood based on the likelihood exceeding other likelihoods of other candidate landmarks (e.g., all other likelihoods of all other candidate landmarks). The likelihood of the candidate landmark being the landmark can be determined based on a number of intersections associated with the candidate landmark being large, a covariance associated with the candidate landmark being small, etc.

At operation 418, the process can include determining one or more remaining landmarks. The remaining landmark(s) can be determined based on the other intersection(s) 406 being disqualified. The remaining landmark(s) can be determined in a similar way as for determining the landmark at operation 402.

An example 420 illustrates groups 410 (e.g., a group 410(a), a group 410(b), and a group 410(c)) determined as landmarks. The landmarks (e.g., positions and covariance data associated with landmarks) can be determined based on the groups 410, and the intersection density of each of the groups 410. By way of example, a position and covariance data (e.g., a covariance) associated with a landmark can be determined based on a group 410, and the intersection density of the group 410. The landmark having the position and the covariance can be determined as the candidate landmark associated with the group 410. The intersection density associated with each of the groups 410 can be determined based on the number of the intersections 406 in the group 410. The intersections 406 can be determined based on the rays 408. In some examples, the group 410(a) can be the group 410 that is determined as the landmark in the example 404. The groups 410(b) and 410(c) can be determined as the landmarks in a similar way as for the group 410(a) (e.g., the group 410 in the example 414). being determined as the landmark. The groups 410(b) and 410(c) can be determined as the landmarks, further based on the other candidate landmarks being determined as disqualified candidate landmarks 416.

After any of the landmarks is determined, the landmark can be determined (e.g., re-determined) as a candidate landmark during a subsequent iteration. In some examples, the landmark re-determined as the candidate landmark associated with the group 410(a) can be determined as the candidate landmark and utilized as discussed above in the example 404. Operations 402, 412, and 418 can be performed (e.g., re-performed) in a similar way, utilizing any candidate landmark determined previously as a landmark, and/or utilizing any candidate landmark (e.g., any newly determined candidate landmarks, based on the re-determining) associated with sensor data (e.g., any newly captured sensor data) discussed above in any of FIGS. 2-3. Determinations of sensor data, ray(s), intersection(s), group(s) of intersections, candidate landmark(s), and landmark(s) can be performed iteratively to improve accuracy of determination of the landmarks. The iterative determining of landmarks continues to refine determinations of landmarks to consider any sensor data captured on an ongoing basis. Iteratively determining of landmarks results in the landmarks being associated with new intersections, results in intersections previously being associated with the candidate landmarks being eliminated as being associated with the candidate landmarks, and/or results in the candidate landmarks being eliminated. Exclusion of any candidate landmark can be eliminated during the iterations based on covariance data associated with the candidate landmarks decreasing. Any candidate landmark associated (or potential grouping of data) with covariance data that increases during iterations can be eliminated.

As a hypothetical example, one traffic light can be included in the environment. Two candidate landmarks can be determined based on captured sensor data associated with the environment. Using iterations as discussed above, eventually the two candidate landmarks can be determined as the same landmark. They will be grouped hierarchically based on covariance data decreasing with each iteration. The two candidate landmarks that eventually merge as once can then be utilized to accurately determine a position and a covariance of the landmark that is associated with the traffic light. To ensure that accuracy of candidate landmarks being utilized to determine landmarks continues to increase with each iteration, any of the candidate landmarks associated with covariance data that increases with respect to a previous iteration is eliminated.

FIG. 5 depicts additional techniques 500 for ensuring accuracy of determining groups and/or eliminating one or more candidate landmarks.

According to technique 502, one or more intersections can be eliminated based on a covariance meeting or exceeding a threshold covariance. Any of the intersection(s) can be eliminated from being adding to a group of intersections based on the covariance meeting or exceeding the threshold covariance. The group of intersections omitting the eliminated intersection(s) can be determined as a candidate landmark based on one or more intersections associated with the covariance. The group can be determined to include the intersections(s) based on the covariance associated with the intersection(s) being less than the threshold covariance. The group, and or one or more of the intersection(s) in the group, can be determined as the candidate landmark.

An example 504 illustrates a covariance 506, and groups of intersections 410 (e.g., the groups of intersections 410(a), 410(b), and 410(c), illustrated in FIG. 4 and discussed above) determined based on the vehicle 204 from which rays 408 are cast. Any covariance (e.g., the covariance 506) can be determined for an intersection (e.g., any intersection 406, or another intersection (not shown) in the example 404) by recasting the intersection 406 into the image data (e.g., image data in the sensor data 206). The covariance 506 can be compared to a covariance (e.g., any covariance 216, or another covariance (not shown) in the sensor data 212) that is initially determined. The intersection utilized to determine the covariance 506 can be eliminated based on the covariance 506 meeting or exceeding the initially determined covariance.

An intersection (not shown), for which a covariance (e.g., any of the covariances 216, or another covariance (e.g., the covariance 506)) is determined, can be eliminated. The intersection utilized to determine the covariance (e.g., the covariance 216 or the covariance 506) can be eliminated (e.g., disqualified) from being included in any group of intersections. Any of the intersection(s) can be determined as a disqualified intersection based on the covariance (e.g., the covariance 216 or the covariance 506) meeting or exceeding a threshold covariance. The disqualified intersection can be omitted from more than one group of intersections (e.g., all of the groups) based on the covariance (e.g., the covariance 216 or the covariance 506) meeting or exceeding the threshold covariance.

According to technique 508, one or more intersections can be eliminated based on a distance associated with the intersection(s) meeting or exceeding a threshold minimum distance. The eliminated intersections can be omitted from being included in any group. The distance associated with the intersection(s) can include a distance between an intersection determined to be associated with a group of intersections, and another intersection. The other intersection utilized to determine the distance can be determined based on a ray. The ray utilized to determine the distance can be determined based on the intersection associated with the group.

In some examples, one or more intersections can be included in a group based on a distance associated with the intersection(s) being less than a threshold minimum distance. The distance associated with the intersection(s) can include a distance between an intersection determined to be associated with a group of intersections, and another intersection. The other intersection utilized to determine the distance can be determined based on a ray. The ray utilized to determine the distance can be determined based on the intersection associated with the group. The group can be determined as including the other intersection, based on the distance being less than the threshold minimum distance. The threshold minimum distance utilized to eliminate the intersection(s) can be the same as, or different from, the threshold minimum distance utilized to determine the intersection(s) as being included in the group.

An example 510 illustrates one or more intersections (e.g., an intersection 512) being eliminated based on a distance 514 associated with the intersection 512 meeting or exceeding threshold minimum distance. The distance 514 associated with the intersection 512, and an intersection (e.g., an intersection 516) associated with a group of intersections can be determined. The distance 514 can be determined as a distance between the intersection 512 and the intersection 516. The intersection 516 can be determined similarly as any of the intersections 406, illustrated in FIG. 4 and discussed above. The intersection 512 utilized to determine the distance 514 can be determined based on a ray (e.g., one of the rays 408 illustrated in FIG. 4 and discussed above). The intersection in the group 410(b) that is closest to the intersection 512 can be determined as an intersection associated with the ray (e.g., the ray 408), with which the intersection 512 is also associated. Elimination of any intersections from any groups, and/or inclusion of any intersections in groups, can be performed iteratively by utilizing the threshold minimum distance.

In some examples, the distance 514 can be determined as a distance between a closest intersection (e.g., the intersection 516) associated with the ray 408. The closest intersection (e.g., the intersection 516) can be determined as an intersection in the group 410(b) that is closest to the intersection 512.

According to technique 518, one or more candidate landmarks can be eliminated based on map data. The candidate landmark(s) can be determined to be associated with a portion of an environment through which the vehicle 204 travels. Any of the candidate landmark(s) (e.g., intersection (s) or groups of intersections associated with the candidate landmark) can be determined as a disqualified candidate landmark based on the portion not being associated with a semantic object. In some examples, the portion (e.g., corner, car, pedestrian, building, street, city square, park, etc.) can be of another type than a semantic object type.

An example 520 illustrates an elimination region 522, and landmarks (e.g., the landmarks 410(a), 410(b), and 410(c), illustrated in FIG. 4 and discussed above) determined based on the vehicle 204 from which rays 408 are cast. One or more intersections (not shown) associated with the elimination region 522 can be determined. The elimination region 522 can be determined based on map data of the environment. The map data can be utilized to cross-check any candidate landmarks. The elimination region 522 can be determined as (e.g., associated with) a portion of an environment. Any intersection, or group of intersections, determined as a candidate landmark can be disqualified. The candidate landmark(s) can be determined to be associated with the elimination region 522 based on a location of the candidate landmark(s) being the same as a location of a portion of the elimination region 522. Any of the candidate landmark(s) (e.g., intersection(s) or groups of intersections associated with the candidate landmark(s)) can be determined to be associated with the elimination region 522 based on the location of the candidate landmark being associated with the portion of the elimination region 522. Any of the candidate landmark(s) associated with the elimination region 522 can be eliminated (e.g., disqualified) based on a pair of coordinates associated with the candidate landmark being the same as a pair of coordinates associated with a point of the elimination region 522. Any of the candidate landmark(s) can be determined to be associated with the elimination region 522 based on the location of the portion of the elimination region 522 being disqualified.

In some examples, the elimination regions 522 can be determined by the map data as being associated with a portion of the environment that is not a semantic object. The portion of the environment can include a corner, a car, a road, a pedestrian, a building, a street, a city square, a park, etc. The portion being another type of object than a semantic object can be utilized to determine the elimination regions 522. The elimination regions 522 can be utilized to eliminate the candidate landmark(s), due to any portion of the environment associated with the eliminations regions 522 not being eligible as a space with any landmarks (e.g., the elimination regions 522 can be used to disqualify any space as a space that might include landmarks).

Any of the candidate landmark(s) can be disqualified based on the elimination region 522 not being associated with a semantic object. Any of the candidate landmark(s) can be disqualified based on the type of the portion being determined to not be the semantic object type.

Figure 6:
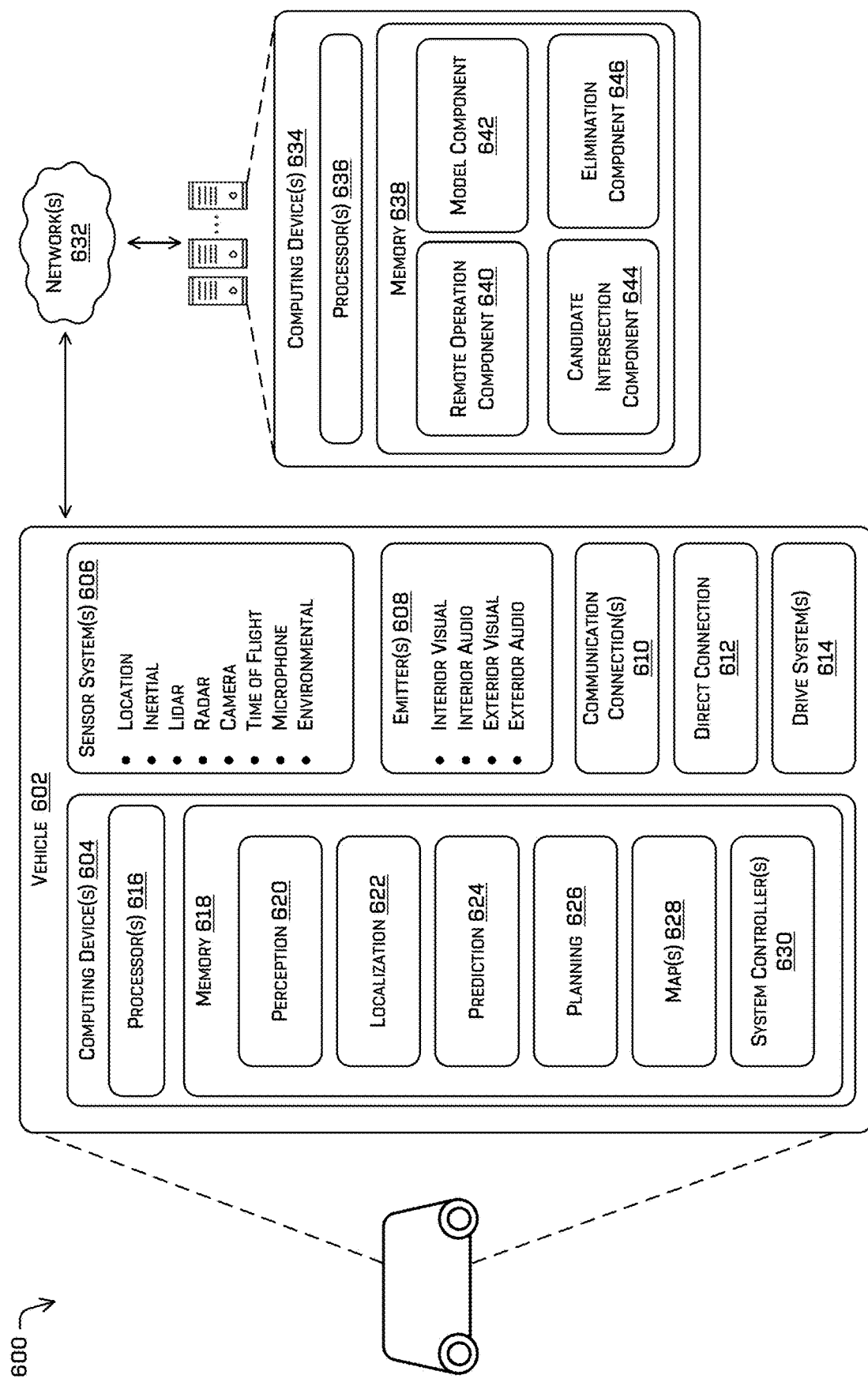
FIG. 6 depicts a block diagram of an example system for implementing the techniques described herein.

Although the candidate landmark(s) can be eliminated as discussed above in techniques 502, 508, and 518, and as illustrated in examples 504, 510, and 520 in this disclosure, it is not limited as such. The candidate landmark(s) can be eliminated based on FIG. 6 depicts a block diagram of an example system 600 for implementing the techniques described herein. In at least one example, the system 600 can include a vehicle 602. In the illustrated example system 600, the vehicle 602 is an autonomous vehicle; however, the vehicle 602 can be any other type of vehicle.

The vehicle 602 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 602 can be configured to control all functions from start to completion of the trip, including all parking functions, it may not include a driver and/or controls for driving the vehicle 602, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 602 can include one or more computing device(s) 604, one or more sensor system(s) 606, one or more emitter(s) 608, one or more communication connection(s) 610 (also referred to as communication devices and/or modems), at least one direct connection 612 (e.g., for physically coupling with the vehicle 602 to exchange data and/or to provide power), and one or more drive system(s) 614. The one or more sensor system(s) 606 can be configured to capture sensor data associated with an environment.

The one or more sensor system(s) 606 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 606 can include multiple instances of each of these or other types of sensors. For instance, the time-of-flight sensors can include individual time-of-flight sensors located at the corners, front, back, sides, and/or top of the vehicle 602. As another example, the camera sensors can include multiple cameras disposed at various locations about the exterior and/or interior of the vehicle 602. The one or more sensor system(s) 606 can provide input to the computing device 604.

The vehicle 602 can also include one or more emitter(s) 608 for emitting light and/or sound. The one or more emitter(s) 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 602 can also include one or more communication connection(s) 610 that enable communication between the vehicle 602 and one or more other local or remote computing device(s) (e.g., a remote teleoperation computing device) or remote services. For instance, the one or more communication connection(s) 610 can facilitate communication with other local computing device(s) on the vehicle 602 and/or the one or more drive system(s) 614. Also, the one or more communication connection(s) 610 can allow the vehicle 602 to communicate with other nearby computing device(s) (e.g., other nearby vehicles, traffic signals, etc.).

The one or more communications connection(s) 610 can include physical and/or logical interfaces for connecting the computing device 604 to another computing device or one or more external networks 632 (e.g., the Internet). For example, the one or more communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 602 can include one or more drive system(s) 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include one or more sensor system(s) 606 to detect conditions of the drive system(s) 614 and/or the surroundings of the vehicle 602. By way of example and not limitation, the sensor system(s) 606 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 614. In some cases, the sensor system(s) 606 on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor system(s) 606 and to control operation of the various vehicle systems. In some examples, the drive system controller can include one or more processor(s) and memory communicatively coupled with the one or more processor(s). The memory can store one or more components to perform various functionalities of the drive system(s) 614. Furthermore, the drive system(s) 614 also include one or more communication connection(s) that enable communication by the respective drive system with one or more other local or remote computing device(s).

The computing device 604 can include one or more processor(s) 616 and memory 618 communicatively coupled with the one or more processor(s) 616. In the illustrated example, the memory 618 of the computing device 604 stores a perception component 620, a localization component 622, a prediction component 624, a planning component 626, a maps component 628, and one or more system controller(s) 630. Though depicted as residing in the memory 618 for illustrative purposes, it is contemplated that the perception component 620, the localization component 622, the prediction component 624, the planning component 626, the maps component 628, and the one or more system controller(s) 630 can additionally, or alternatively, be accessible to the computing device 604 (e.g., stored in a different component of vehicle 602) and/or be accessible to the vehicle 602 (e.g., stored remotely).

The perception component 620 can include functionality to perform object detection, segmentation, and/or classification. In some examples, the perception component 620 can provide processed sensor data that indicates a presence of an entity that is proximate to the vehicle 602 and/or a classification of the entity as an entity type (e.g., car, pedestrian, cyclist, building, tree, road surface, curb, sidewalk, unknown, etc.). In additional and/or alternative examples, the perception component 620 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

Further, the perception component 620 can include functionality to store perception data generated by the perception component 620. In some instances, the perception component 620 can determine a track corresponding to an object that has been classified as an object type. For purposes of illustration only, the perception component 620, using sensor system(s) 606 can capture one or more images of an environment. The sensor system(s) 606 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 606, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

In general, the perception component 620 can detect (among other things) semantic objects represented by sensor data. In some examples, the perception component 620 can identify such semantic objects and can determine a two-dimensional or a three-dimensional bounding box associated with the object. The perception component 620 can determine covariance data associated with the object and/or a center point associated with the object, as discussed herein. The perception component 620 can determine additional information such as a location, orientation, pose, and/or size (e.g., length, width, height, etc.) associated with the object. The perception component 620 can send data to other components of the system 600 for localization and/or determining calibration information, as discussed herein.

The localization component 622 can include functionality to receive data from the sensor system(s) 606 and/or other components to determine a position of the vehicle 602. For example, the localization component 622 can include and/or request/receive a three-dimensional map of an environment and can continuously determine a location of the autonomous vehicle within the map. In some instances, the localization component 622 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 622 can provide data to various components of the vehicle 602 to determine an initial position of an autonomous vehicle for generating a trajectory, as discussed herein.

Further, the localization component 622 can receive map data representing semantic objects and can receive detections of such semantic objects in sensor data for determining a location of the vehicle 602, as discussed herein.

The localization component 622 can include functionality to project sensor data representing semantic object(s) into captured sensor data for object matching, as discussed here.

The localization component 622 can include functionality to determine a distance between a semantic map object and a corresponding sensed object. The localization component 622 can update an estimated location of the vehicle to globally minimize the distances. That is, a global minimum of distances may indicate that an estimated location has been determined by the localization component 622.

The prediction component 624 can generate one or more probability maps representing prediction probabilities of possible locations of one or more objects in an environment. For example, the prediction component 624 can generate one or more probability maps for vehicles, pedestrians, animals, and the like within a threshold distance from the vehicle 602. In some instances, the prediction component 624 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 626 can determine a path for the vehicle 602 to follow to traverse through an environment. For example, the planning component 626 can determine various routes and paths and various levels of detail. In some instances, the planning component 626 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 626 can generate an instruction for guiding the autonomous vehicle along at least a portion of the route from the first location to the second location. In at least one example, the planning component 626 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 626 can alternatively, or additionally, use data from the perception component 620 and/or the prediction component 624 to determine a path for the vehicle 602 to follow to traverse through an environment. For example, the planning component 626 can receive data from the perception component 620 and/or the prediction component 624 regarding objects associated with an environment. Using this data, the planning component 626 can determine a route to travel from a first location (e.g., a current location) to a second location (e.g., a target location) to avoid objects in an environment. In at least some examples, such a planning component 626 may determine there is no such collision free path and, in turn, provide a path which brings vehicle 602 to a safe stop avoiding all collisions and/or otherwise mitigating damage.

The memory 618 can further include one or more maps 628 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. A map can further include an object identifier, an object classification, a three-dimensional location, covariance data (e.g., represented in image data or a multi-resolution voxel space), and the like. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 628 can include at least one map (e.g., images and/or a mesh). In some examples, the vehicle 602 can be controlled based at least in part on the map(s) 628. That is, the map(s) 628 can be used in connection with the perception component 620 (and sub-components), the localization component 622 (and sub-components), the prediction component 624, and/or the planning component 626 to determine a location of the vehicle 602, identify objects in an environment, generate prediction probabilit(ies) associated with objects and/or the vehicle 602, and/or generate routes and/or trajectories to navigate within an environment.

In at least one example, the computing device 604 can include one or more system controller(s) 630, which can be configured to control steering, propulsion, braking, safety, emitters, communication, and other systems of the vehicle 602. These system controller(s) 630 can communicate with and/or control corresponding systems of the drive system(s) 614 and/or other components of the vehicle 602, which may be configured to operate in accordance with a path provided from the planning component 626.

The vehicle 602 can connect to computing device(s) 634 via network 632 and can include one or more processor(s) 636 and memory 638 communicatively coupled with the one or more processor(s) 636. In at least one instance, the one or more processor(s) 636 can be similar to the processor(s) 616 and the memory 638 can be similar to the memory 618. In the illustrated example, the memory 638 of the computing device(s) 634 stores a remote operation component 640, a model component 642, a candidate landmark component 644, and/or an elimination component 646. In at least one instance, the model component 642, after empirical testing and/or simulations, can include the models for determining a location, as discussed herein. Though depicted as residing in the memory 638 for illustrative purposes, it is contemplated that the remote operation component 640, the model component 642, the candidate landmark component 644, and/or the elimination component 646 can additionally, or alternatively, be accessible to the computing device(s) 604 (e.g., stored in a different component of computing device(s) 604 and/or be accessible to the computing device(s) 604 (e.g., stored remotely). Each of the remote operation component 640, the model component 642, the candidate landmark component 644, and the elimination component 646 can be implemented separately, or in combination with one or more of the others. In some examples, one or more of the remote operation component 640, the model component 642, the candidate landmark component 644, and the elimination component 646 can be utilized to implement any of the processes in FIGS. 1-5. However, although none of the processes in FIGS. 1-5 is limited to being performed by such components and systems.

Although various components (e.g., the model component 642, the candidate landmark component 644, and/or the elimination component 646) in the computing device(s) 634 connected to the vehicle 602 by the network 632 are discussed in this disclosure, it is not limited as such. One or more of the model component 642, the candidate landmark component 644, and/or the elimination component 646 can be included in (e.g., performed by) the vehicle 602. In some examples, a portion (e.g., a complete portion or a partial portion) of any of the model component 642, the candidate landmark component 644, and/or the elimination component 646 can be included in (e.g., performed by) the computing device(s) 634. In those examples, a portion (e.g., a complete portion or a partial portion) of any of the model component 642, the candidate landmark component 644, and/or the elimination component 646 can be included in (e.g., performed by) the vehicle 602. Any portion of any of those components implemented as (e.g., performed by) part of the computing device(s) 634 can be the same as, or different from, any portion of any of those components implemented as (e.g., performed by) part of the vehicle 602.

As discussed herein, the remote operation component 640 can include functionality to receive sensor data. In some examples, the remote operation component 640 can control the vehicle 602 based on the sensor data. In some examples, the remote operation component 640 can include teleoperators or operators who can control the vehicle 602 or can provide instructions to the vehicle based on one or more landmarks.

The model component 642 can include functionality to generate models for determining landmarks, as discussed herein. The model component 642 can control, and/or be operated in cooperation with, the candidate landmark component 644 and the elimination component 646. Although the model component 642 being separate from the candidate landmark component 644 and the elimination component 646 is discussed in this disclosure, it is not limited as such. The model component 642 can be combined (e.g., integrated) with one or more of the candidate landmark component 644 and the elimination component 646. In some examples, the model component 642 can be utilized to determine rays extending from a vehicle through semantic objects, determine intersections as candidate landmarks associated with the rays, and determine landmarks based on the candidate landmarks. The model component 642 can aggregate data across a plurality of vehicles (e.g., a fleet of vehicles) to determine landmarks. Further, the model component 642 can provide the landmarks to the remote operation component 640 that determines actions to be performed by vehicles, as discussed herein.

The candidate landmark component 644 can determine one or more intersections as candidate landmarks. The candidate landmarks can be determined based on rays extending from one or more vehicles travelling through an environment, as discussed herein. A group that includes the intersections can be determined as candidate landmark based on an intersection density associated with the group.

The elimination component 646 can be utilized to disqualify candidate landmarks. The elimination component 646 can determine candidate landmarks as disqualified candidate landmarks. The disqualified candidate landmarks can be determined based on one or more of landmarks, a threshold covariance, map data, a threshold minimum distance, etc., as discussed herein.

The processor(s) 616 of the computing device 604 and the processor(s) 636 of the computing device(s) 634 can be any suitable processor capable of executing instructions to process data and perform operations as described herein. By way of example and not limitation, the processor(s) 616 and 636 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 618 computing device 604 and the memory 638 of the computing device(s) 634 are examples of non-transitory computer-readable media. The memory 618 and 638 can store an operating system and one or more software applications, instructions, programs, and/or data to implement the methods described herein and the functions attributed to the various systems. In various implementations, the memory 618 and 638 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 618 and 638 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Accordingly, the techniques discussed herein provide techniques for localizing a vehicle in an environment and for determining calibration information associated with sensors of the vehicle.

Figure 7:
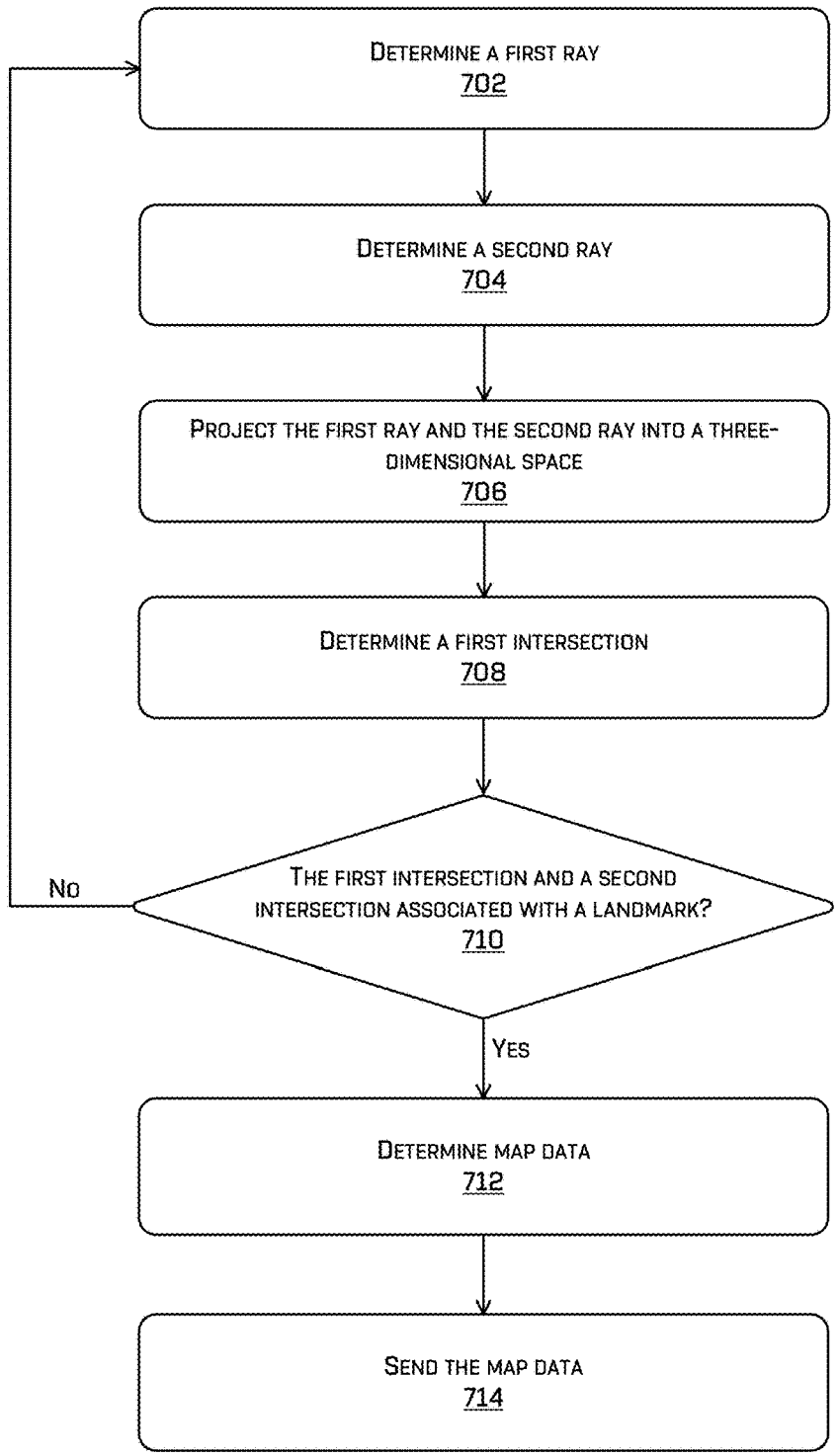
FIG. 7 is an example process for determining a location of a vehicle in an environment.

FIG. 7 is an example process for determining a location of a vehicle in an environment. For example, some or all of the process 700 can be performed by one or more components in FIG. 6, as described herein. For example, some or all of the process 700 can be performed by the remote operation component 640, the model component 642, the candidate landmark component 644, and/or the elimination component 646.

At operation 702, the process can include determining a first ray (e.g., a ray 222). The ray 222 can be determined further based on first image data. The first image data representing an environment can be received from a vehicle (e.g., the vehicle 204) at a first time (e.g., a time t1). The first image data can be associated with a first vehicle pose of the vehicle 204. The first image data can be included in sensor data (e.g., the sensor data 206). The sensor data 206 can be utilized to determine a first object detection in the first image data. The first object detection can include a semantic object (e.g., an object 208). The ray 222 can be determined based on a bounding box (e.g., a bounding box 214) and/or covariance data (e.g., covariance data 216). The bounding box 214 and the covariance data 216 can be determined based on the object 208. The ray 222 can extend through the bounding box 214 and/or the covariance data 216.

At operation 704, the process can include determining a second ray (e.g., a ray 228). The ray 228 can be determined based on second image data. The second image data representing the environment can be received from the vehicle 204 at a second time (e.g., a time t2). The second image data can be associated with a second vehicle pose of the vehicle 204. A portion (e.g., a full portion of a partial portion) of the first image data can be the same as a portion (e.g., a full portion of a partial portion) of the second image data. Each of the first image data and the second image data can be included in sensor data (e.g., the sensor data 206). The sensor data 206 can be utilized to determine a second object detection in the second image data. The second object detection can include the object 208. The ray 228 can be determined based on the bounding box 214) and/or the covariance data 216. The ray 228 can extend through the bounding box 214 and/or the covariance data 216

At operation 706, the process can include determining, in a three-dimensional space, the first ray (e.g., the ray 222) and the second ray (e.g., the ray 228) cast into the three-dimensional space comprising a plurality of rays. In some examples, the ray 222 and the ray 228 can be cast through a portion of the sensor data 206 associated with the object 208.

At operation 708, the process can include determining an intersection (e.g., an intersection 240, which can be implemented as an intersection 406). The intersection 240 can be determined as an intersection between the first ray (e.g., the ray 222) and the second ray. The intersection 240 can be associated with the object 208. The intersection 240 can be associated with the bounding box 214 and the covariance data 216. The intersection 240 can be utilized to determine a group of intersections 410 (e.g., the intersection 240 can be determined to be included in the group 410). Intersection(s) can be eliminated from groups, and/or intersection(s) can be determined to be included in groups, based on a covariance, a mesh, or a distance associated with the other candidate landmarks.

In some examples, a first intersection (e.g., a first one of the intersections 406) and the second intersection (e.g., a second one of the intersections 406) can be determined as being associated with the landmark based on the rays 222 and 228. The first intersection 406 can be associated with a ray 222. The second intersection 406 can be associated with a ray 228. The landmark can be determined further based on a group of intersections 410. The group 410 can be determined as a group that includes the first intersection 406 and the second intersection 406. The first intersection 406 and the second intersection 406 can be determined to be associated with a candidate landmark. The group 410 can be determined as the candidate landmark based on an intersection density associated with the group 410. The candidate landmark can be determined based on the intersection density meeting or exceeding a first threshold density (e.g., a threshold set as a predetermined threshold).

The group 410 that includes one of more of the intersections (e.g., the first intersection 406 and the second intersection 406) can be determined as the landmark. The landmark can be determined based on the intersection density of the group meeting or exceeding a second threshold density (e.g., a threshold set as a highest density among all of the intersection densities of remaining groups).

The landmark can be utilized to disqualify another candidate landmark (e.g., another candidate landmark). The other candidate landmark can be disqualified based on being determined as a candidate landmark that is associated with one of the rays 222 and 228 with which the landmark is associated. Other candidate landmarks can be eliminated based on a covariance, a mesh, or a distance associated with the other candidate landmarks. Landmarks can be iteratively determined based on candidate landmarks and utilized to disqualify other candidate landmarks.

At operation 710, the process can include, if the first intersection and a second intersection (e.g., another of the intersections 406) are not associated with any landmark, continuing to 702. If the first intersection and the second intersection are associated with the landmark, the operation continues to 712.

At operation 712, the process can include determining map data. The map data can be determined based on the landmark. The map data can be determined to include a location of the landmark.

At operation 714, the process can include sending the map data to a vehicle to navigate the vehicle through the environment. In some examples, the vehicle can be an autonomous vehicle.

EXAMPLE CLAUSES

A: A system comprising: one or more processors; and one or more computer-readable media storing instructions executable by the one or more processors, wherein the instructions, when executed, cause the system to perform operations comprising: receiving first image data and second image data representing an environment, the first image data associated with a first sensor pose and the second image data associated with a second sensor pose; determining a first object detection in the first image data and a second object detection in the second image data; determining, based at least in part on the first object detection and the first sensor pose, a first ray; determining, based at least in part on the second object detection and the second sensor pose, a second ray; determining a first intersection associated with the first ray and the second ray; determining, based at least in part on the first intersection and a second intersection associated with other rays, a first candidate landmark; determining, based at least in part on the first candidate landmark being more likely to be a landmark than a second candidate landmark, that the first candidate landmark is a landmark; based at least in part on determining the landmark, disqualifying the second candidate landmark; associating the landmark with a map data; and sending the map data to an autonomous vehicle, the map data configured to be used by the autonomous vehicle to navigate through the environment.

B: The system of paragraph A, the operations further comprising: determining, based on the landmark, that a first detected object associated with the first object detection is a second detected object associated with the second object detection.

C: The system of paragraph A or B, the operations further comprising: determining a position and a covariance of the first candidate landmark based at least in part on a density of intersections.

D: The system of any of paragraphs A-C, the operations further comprising: eliminating a candidate landmark based at least in part on at least one of: covariance data associated with the first object detection or the second object detection; second map data; data between the candidate landmark and another candidate landmark; a number of data points associated with a group being less than a threshold number of points, the group being associated with the candidate landmark; a difference between a first time associated with a first data point of the group and a second time associated with a second data point of the group meeting or exceeding a time threshold; a semantic class of sensor data, the sensor data including the first image data or the second image data; or a number of sensors associated with the sensor data being less than a threshold number of sensors.

E: The system of any of paragraphs A-D, the operations further comprising: determining a first likelihood associated with the first candidate landmark being the landmark and a second likelihood associated with the second candidate landmark being the landmark; determining the first likelihood is greater than the second likelihood; and disqualifying the second candidate landmark based on the first likelihood being greater than the second likelihood.

F: A method comprising: receiving first sensor data and second sensor data representing an environment; determining, based at least in part on a first object represented in the first sensor data, a first ray; determining, based at least in part on a second object represented in the second sensor data, a second ray; determining an intersection associated with the first ray and the second ray; determining, based at least in part on the intersection, a landmark; and associating the landmark with map data.

G: The method of paragraph F, wherein: the first sensor data is associated with a first sensor pose; the second sensor data is associated with a second sensor pose that is different than the first sensor pose; the first ray is determined further based at least in part on the first sensor pose; and the second ray is determined further based at least in part on the second sensor pose.

H: The method of paragraph F or G, wherein the intersection is a first intersection, and the landmark is a first landmark, the method further comprising: determining, based at least in part on the first intersection and a second intersection, a first candidate landmark; determining, based at least in part on the first candidate landmark being more likely to be a landmark than a second candidate landmark, that the first candidate landmark is the landmark; and based at least in part on determining the landmark, disqualifying the second candidate landmark.

I: The method of any of paragraphs F-H, wherein determining the intersection is further based at least in part on determining that the first object is the second object.

J: The method of any of paragraphs F-I, further comprising: determining a position and a covariance of the landmark based at least in part on a density of intersections.

K: The method of any of paragraphs F-J, further comprising: eliminating a candidate landmark based at least in part on at least one of: covariance data associated with detection the first object or the second object; second map data; data between the candidate landmark and another candidate landmark; a number of data points associated with a group being less than a threshold number of points, the group being associated with the candidate landmark; a difference between a first time associated with a first data point of the group and a second time associated with a second data point of the group meeting or exceeding a time threshold; a semantic class of sensor data, the sensor data including the first sensor data or the second sensor data; or a number of sensors associated with the sensor data being less than a threshold number of sensors.

L: The method of any of paragraphs F-K, further comprising: iteratively determining landmarks and disqualifying candidate landmarks.

M: The method of any of paragraphs F-L, further comprising: determining the intersection based at least in part on an object type associated with the first object and the second object.

N: The method of any of paragraphs F-M, wherein the map data is used for semantic localization of an autonomous vehicle.

O: The method of any of paragraphs F-N, wherein the first sensor data and the second sensor data are at least one of: received from a same sensor at different times; received from different sensors on a same vehicle; or received from different vehicles.

P: One or more non-transitory computer-readable media storing instructions that, when executed, cause one or more processors to perform operations comprising: receiving first image data and second image data representing an environment; determining, based at least in part on a first object represented in the first image data, a first ray; determining, based at least in part on a second object represented in the second image data, a second ray; casting the first ray and the second ray into a three-dimensional space comprising a plurality of rays; determining a first intersection associated with the first ray and the second ray; determining, based at least in part on the first intersection and a second intersection associated with other rays, a landmark; determining, based at least in part on the landmark, map data; and sending the map data to an autonomous vehicle to navigate the autonomous vehicle through the environment.

Q: The one or more non-transitory computer-readable media of paragraph P, wherein: the first image data is associated with a first vehicle pose; the second image data associated with a second vehicle pose that is different than the first vehicle pose; the first ray is determined further based at least in part on the first object and the first vehicle pose; and the second ray is determined further based at least in part on the second object and the second vehicle pose.

R: The one or more non-transitory computer-readable media of paragraph P or Q, wherein the landmark is a first landmark, the operations further comprising: determining, based at least in part on the first intersection and the second intersection associated with other rays, a first candidate landmark; determining, based at least in part on the first candidate landmark being more likely to be a landmark than a second candidate landmark, that the first candidate landmark is the landmark; and based at least in part on determining the landmark, disqualifying the second candidate landmark.

S: The one or more non-transitory computer-readable media of any of paragraphs P-R, wherein the first image data and the second image data are at least one of: received from a same sensor at different times; received from different sensors on a same vehicle; or received from different vehicles.

T: The one or more non-transitory computer-readable media of any of paragraphs P-S, wherein the first image data and the second image data are received from different vehicles.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more computer-readable media storing instructions executable by the one or more processors, wherein the instructions, when executed, cause the system to perform operations comprising:
receiving first image data and second image data representing an environment, the first image data associated with a first sensor pose and the second image data associated with a second sensor pose;
determining a first object detection in the first image data and a second object detection in the second image data;
determining, based at least in part on the first object detection and the first sensor pose, a first ray;
determining, based at least in part on the second object detection and the second sensor pose, a second ray;
determining a first intersection associated with the first ray and the second ray;
determining, based at least in part on the first intersection and a second intersection associated with other rays, a first candidate landmark;
determining a third intersection associated with a third ray and at least one of the first ray or the second ray;
determining, based at least in part on the first candidate landmark being more likely to be a landmark than a second candidate landmark, that the first candidate landmark is the landmark;
based at least in part on determining the landmark, disqualifying the second candidate landmark, the second candidate landmark being associated with the third intersection;
associating the landmark with map data; and
causing an autonomous vehicle to drive through the environment using the map data.

2. The system of claim 1, the operations further comprising:
determining, based on the landmark, that a first detected object associated with the first object detection is a second detected object associated with the second object detection.

3. The system of claim 1, the operations further comprising:
determining a position and a covariance of the first candidate landmark based at least in part on a density of intersections.

4. The system of claim 1, the operations further comprising:
eliminating a candidate landmark based at least in part on at least one of:
covariance data associated with the first object detection or the second object detection;
other map data;
data between the candidate landmark and another candidate landmark;
a number of data points associated with a group being less than a threshold number of points, the group being associated with the candidate landmark;
a difference between a first time associated with a first data point of the group and a second time associated with a second data point of the group meeting or exceeding a time threshold;
a semantic class of sensor data, the sensor data including the first image data or the second image data; or
a number of sensors associated with the sensor data being less than a threshold number of sensors.

5. The system of claim 1, the operations further comprising:
determining a first likelihood associated with the first candidate landmark being the landmark and a second likelihood associated with the second candidate landmark being the landmark;
determining the first likelihood is greater than the second likelihood; and
disqualifying the second candidate landmark based on the first likelihood being greater than the second likelihood.

6. The system of claim 1, further comprising:
receiving third image data representing the environment, the third image data associated with a third sensor pose;
determining a third object detection in the third image data; and
determining, based at least in part on the third object detection and the third sensor pose, the third ray.

7. A method comprising:
receiving first sensor data and second sensor data representing an environment;
determining, based at least in part on a first object represented in the first sensor data, a first ray;
determining, based at least in part on a second object represented in the second sensor data, a second ray;
determining a first intersection associated with the first ray and the second ray;
determining, based at least in part on the first intersection, a landmark;
determining a second intersection associated with a third ray and at least one of the first ray or the second ray;
based at least in part on determining the landmark, disqualifying a candidate landmark, the candidate landmark being associated with the second intersection;
associating the landmark with map data; and
causing an autonomous vehicle to drive through the environment using the map data.

8. The method of claim 7, wherein:
the first sensor data is associated with a first sensor pose;
the second sensor data is associated with a second sensor pose that is different than the first sensor pose;
the first ray is determined further based at least in part on the first sensor pose; and the second ray is determined further based at least in part on the second sensor pose.

9. The method of claim 7, the method further comprising:
determining, based at least in part on the first intersection and a third intersection, a first candidate landmark, the candidate landmark that is disqualified being a second candidate landmark;
determining, based at least in part on the first candidate landmark being more likely to be the landmark than the second candidate landmark, that the first candidate landmark is the landmark; and
based at least in part on determining that the first candidate landmark is the landmark, disqualifying the second candidate landmark.

10. The method of claim 7, wherein determining the first intersection is based at least in part on determining that the first object is the second object.

11. The method of claim 7, further comprising:
eliminating the candidate landmark based at least in part on at least one of:
covariance data associated with detection of the first object or the second object;
other map data;
data between the candidate landmark and another candidate landmark;
a number of data points associated with a group being less than a threshold number of points, the group being associated with the candidate landmark;
a difference between a first time associated with a first data point of the group and a second time associated with a second data point of the group meeting or exceeding a time threshold;
a semantic class of sensor data, the sensor data including the first sensor data or the second sensor data; or
a number of sensors associated with the sensor data being less than a threshold number of sensors.

12. The method of claim 7, further comprising:
iteratively determining landmarks and disqualifying candidate landmarks.

13. The method of claim 7, further comprising:
determining the first intersection based at least in part on an object type associated with the first object and the second object.

14. The method of claim 7, wherein the map data is further used for semantic localization of the autonomous vehicle.

15. The method of claim 7, wherein the first sensor data and the second sensor data are at least one of:
received from a same sensor at different times;
received from different sensors on the autonomous vehicle; or
received from different vehicles than the autonomous vehicle.

16. One or more non-transitory computer-readable media storing instructions that, when executed, cause one or more processors to perform operations comprising:
receiving first image data and second image data representing an environment;
determining, based at least in part on a first object represented in the first image data, a first ray;
determining, based at least in part on a second object represented in the second image data, a second ray;
casting the first ray and the second ray into a three-dimensional space comprising a plurality of rays;
determining a first intersection associated with the first ray and the second ray;
determining, based at least in part on the first intersection and a second intersection associated with other rays in the plurality of rays, a landmark;
determining a third intersection associated with a third ray and at least one of the first ray or the second ray;
based at least in part on determining the landmark, disqualifying a candidate landmark, the candidate landmark being associated with the third intersection;
determining, based at least in part on the landmark, map data; and
causing an autonomous vehicle to drive through the environment using the map data.

17. The one or more non-transitory computer-readable media of claim 16, wherein:
the first image data is associated with a first vehicle pose;
the second image data is associated with a second vehicle pose that is different than the first vehicle pose;
the first ray is determined further based at least in part on the first vehicle pose; and
the second ray is determined further based at least in part on the second vehicle pose.

18. The one or more non-transitory computer-readable media of claim 16, the operations further comprising:
determining, based at least in part on the first intersection and the second intersection associated with the other rays, a first candidate landmark, the candidate landmark that is disqualified being a second candidate landmark;
determining, based at least in part on the first candidate landmark being more likely to be the landmark than the second candidate landmark, that the first candidate landmark is the landmark; and
based at least in part on determining that the first candidate landmark is the landmark, disqualifying the second candidate landmark.

19. The one or more non-transitory computer-readable media of claim 16, wherein the first image data and the second image data are at least one of:
received from a same sensor at different times;
received from different sensors on the autonomous vehicle; or
received from different vehicles than the autonomous vehicle.

20. The one or more non-transitory computer-readable media of claim 16, wherein the first image data and the second image data are received from different vehicles than the autonomous vehicle.

* * * * *